May 7, 1940.  A. W. WHITEFORD  2,200,129
BEARING MEMBER
Filed Sept. 9, 1938

INVENTOR
A. W. Whiteford
BY John O. Seifert
ATTORNEY

Patented May 7, 1940

2,200,129

UNITED STATES PATENT OFFICE 2,200,129

BEARING MEMBER

Alexander W. Whiteford, New York, N. Y.

Application September 9, 1938, Serial No. 229,045

3 Claims. (Cl. 308—239)

This invention relates to bearing members, such as pins, shafts, stud shafts and the like which support bearing pressure in a female bearing member of a bearing coupling, or relative to which such a female bearing moves. Bearing members of this character wear away in a very short time when made of the same metal, or of a metal of the same hardness, as the co-operating female member of a bearing coupling. In order that the wearing away of a bearing pin, shaft and the like will be reduced to a minimum and take place in the female member of a bearing coupling, said female member is made in the form of separable and removable bushings of a material of less hardness than the bearing, pin, shaft and the like supporting the bearing pressure. To avoid making the entire bearing pin, shaft or the like of an expensive hard metal or alloy of metals and to utilize a relatively soft metal for the major portion of the bearing pin, shaft and the like, the portion or portions thereof to take up the supporting bearing pressure is provided with inserts of hard wear resisting metal.

It is the object of the present invention to provide a bearing member, such as a pin, shaft, stud shaft, axle and the like of relative soft material and arrange a portion or portions thereof adapted to have sliding or rotary contact with a metallic bearing surface or surfaces and take up the supporting bearing pressure with inserts of an alloy of metals having the property of not only having greater wear resistance and greater durability than the metal of the bearing member, but also having a very low co-efficient of friction, and provide an improved arrangement of such inserts in the bearing surface or surfaces of the bearing member whereby to take up the supporting bearing pressure or pressures through two or more of such inserts.

Figure 1:
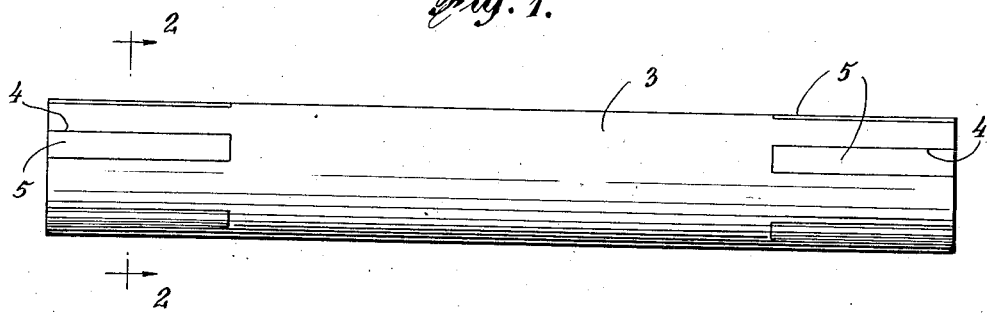
Figure 2:
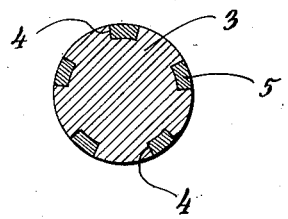

In the drawing accompanying and forming a part of this application, Figure 1 is a side elevation of a pin or shaft showing the invention applied thereto, and Figure 2 is a cross sectional view taken on the line 2—2 of Figure 1 looking in the direction of the arrows.

In carrying out the invention, there is provided a cylindrical member 3 of relatively soft metal, such as steel, which may comprise a connecting pin, a shaft, stud shaft, or axle of any length and diameter, or may constitute any other type of bearing member. As shown, the member 3 is adapted to support the load or supporting bearing pressures adjacent the opposite ends, and for this purpose a medium is inserted into the peripheral surface thereof that will resist wear when metallic contact exists between the end portions of the member 3 and another bearing surface or surfaces. This medium consists of an alloy of metals having the property of being non-corrosive and a low coefficient of friction as well as wear resisting, and comprises an alloy of a close grain metal, such as tungsten, a wear resisting metal, such as cobalt, and a smooth anti-friction metal, such as chromium.

The wear resisting and non-corrosive material is inserted into the peripheral surface of the member 3 and, as shown, is effected by arranging recesses 4 in the peripheral surface of the member 3, said recesses being equidistantly spaced about and extending longitudinally of said member, and may consist of milling cuts extended inwardly from the ends of said member. Strips 5 of the non-corrosive and wear resisting material are inserted into the recesses and preferably integrally united with the material of the member 3 by blowing or sweating the inserts into the recesses, as by electric or oxyacetylene welding. The strips or inserts 5 are originally of a thickness greater than the depth of the recesses 4 so that a portion of the inserts projects from the peripheral surface of the member 3. After the inserts have been secured in the recesses, the projecting portions are ground down so that the outer surfaces of the inserts are flush with the peripheral surface of the member 3. Or if desired, the inserts may be ground down to circumscribe a circle having a greater diameter than the diameter of the member 3, whereby the inserts will project from the periphery of the member 3 and constitute the sole contacting surface of the bearing, and will provide grooves or spaces between the inserts 5 which may act as lubricant grooves.

The inserts are of an odd or uneven number and are at least five in number, as shown, whereby two or more of the inserts 5 of wear resisting material will at all times contact the bearing face of the female bearing member and constitute the pressure or load supporting and wear resisting areas of the bearing pin.

The surface areas of the several inserts 5 are proportioned in relation to the bearing surface of the member 3 inversely as the hardness of the metal of the inserts 5 and of the member 3 bear relative to each other, whereby such wear as takes place by the movement of the female bearing member relative to the bearing portion of the member 3, or of the member 3 relative to the female bearing member, will be equal throughout the circumference of the bearing portion of the member 3.

Having described my invention, I claim:

1. As an article of manufacture, a rotatable bearing member comprising an elongated cylindrical body of relatively soft metal having a series of recesses spaced about and extending inwardly from the end of the body parallelly of the axis thereof, and strips of hard metal inserted in said recesses and integrally united to the metal of the bearing member, said recesses and inserts being disposed about the bearing member whereby at least two of the inserts at all times engage a co-operating bearing member and take up the pressure of the load on the bearing member, and the metal of said inserts being non-corrosive and having a low coefficient of friction and greater wear resistance than the metal of the bearing member.

2. As an article of manufacture, a rotatable bearing member comprising a cylindrical body of relatively soft metal having inserts of a hard metal alloy including tungsten, cobalt and chromium in the peripheral surface and extending parallelly of the axis of the bearing member with the outer surface of the inserts flush with the surface of the bearing member, and said inserts spaced about the bearing member to at all times support and take up the pressure of the load on the bearing member by two or more of said inserts in the rotative movement of the bearing member.

3. As an article of manufacture, a rotatable bearing member comprising an elongated cylindrical body of relatively soft metal having recesses of equal width and depth and of less length than the bearing member extended into the ends of the bearing member parallelly of the axis thereof, strips of hard metal inserted in said recesses and integrally united by welding to the material of the bearing member with the exposed surface of the strips flush with the peripheral surface of the bearing member, the metal of said strips having the property of being non-corrosive and having greater wear resistance than the metal of the bearing member and a low coefficient of friction, and said strips spaced about the bearing member whereby two or more of said strips are adapted to at all times support and take up the pressure of the load on the ends of the bearing member in the rotative movement thereof.

ALEXANDER W. WHITEFORD.